(12) United States Patent
Eide et al.

(10) Patent No.: US 8,561,064 B2
(45) Date of Patent: Oct. 15, 2013

(54) RETAINING OWNERSHIP OF A VIRTUAL FUNCTION WHILE AN ADAPTER IS REPLACED

(75) Inventors: Curtis S. Eide, Rochester, MN (US); Jonathan L. Kaus, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 356 days.

(21) Appl. No.: 12/912,251

(22) Filed: Oct. 26, 2010

(65) Prior Publication Data

US 2012/0102490 A1    Apr. 26, 2012

(51) Int. Cl.
*G06F 9/455* (2006.01)
*G06F 9/46* (2006.01)
*G06F 12/14* (2006.01)

(52) U.S. Cl.
USPC ............................... 718/1; 718/100; 710/200

(58) Field of Classification Search
USPC ....................... 718/1, 100; 710/200
See application file for complete search history.

(56) References Cited

U.S. PATENT DOCUMENTS

| 4,747,041 | A * | 5/1988 | Engel et al. ................. 713/324 |
| 7,039,820 | B2 * | 5/2006 | Armstrong et al. ........... 713/324 |
| 7,464,209 | B2 * | 12/2008 | Armstrong et al. ........... 710/200 |
| 8,402,461 | B2 * | 3/2013 | Santos et al. ..................... 718/1 |
| 2004/0181625 | A1 * | 9/2004 | Armstrong et al. ........... 710/200 |
| 2009/0133016 | A1 * | 5/2009 | Brown et al. ..................... 718/1 |
| 2009/0133028 | A1 | 5/2009 | Brown et al. |
| 2009/0144731 | A1 * | 6/2009 | Brown et al. ..................... 718/1 |
| 2010/0290467 | A1 * | 11/2010 | Eisenhauer et al. .......... 370/392 |
| 2013/0031547 | A1 * | 1/2013 | Kutch .............................. 718/1 |

* cited by examiner

*Primary Examiner* — Emerson Puente
*Assistant Examiner* — Willy W Huaracha
(74) *Attorney, Agent, or Firm* — Owen J. Gamon (57) ABSTRACT

In an embodiment, a power off command is received that specifies a slot in a computer that connects to a first adapter. The first adapter comprises a physical and virtual functions. Data transfer from a logical partition to the virtual function is stopped, a lock of the virtual function held by the logical partition is released, and the slot is powered off. Ownership of the virtual function is retained by the logical partition while the lock is released and the slot is powered off. A power on command is received that specifies the slot that connects to a second adapter. The second adapter comprises the physical and virtual functions. In response to the power on command, the slot is powered on, and the lock is obtained of the virtual function for the logical partition.

17 Claims, 6 Drawing Sheets

FIG. 1

PARTITIONABLE ENDPOINT LOCK/ OWNERSHIP TABLE 128-1

| PARTITIONABLE ENDPOINT | LOCK HOLDER | OWNER | |
|---|---|---|---|
| C1 | HYPERVISOR | HYPERVISOR | 201 |
| C2 | HYPERVISOR | HYPERVISOR | 202 |
| VF1A | LP1 | LP1 | 203 |
| VF2A | LP3 | LP3 | 204 |
| VF1B | LP2 | LP2 | 205 |
| VF2B | LP4 | LP4 | 206 |

FIG. 2

PARTITIONABLE ENDPOINT LOCK/ OWNERSHIP TABLE 128-2

| PARTITIONABLE ENDPOINT | LOCK HOLDER | OWNER | |
|---|---|---|---|
| C1 | HYPERVISOR | HYPERVISOR | 301 |
| C2 | HYPERVISOR | HYPERVISOR | 302 |
| VF1A |  | LP1 | 303 |
| VF2A |  | LP3 | 304 |
| VF1B | LP2 | LP2 | 305 |
| VF2B | LP4 | LP4 | 306 |

FIG. 3

PARTITIONABLE ENDPOINT LOCK/ OWNERSHIP TABLE 128-3

| PARTITIONABLE ENDPOINT | LOCK HOLDER | OWNER | |
|---|---|---|---|
| C1 |  | HYPERVISOR | 401 |
| C2 | HYPERVISOR | HYPERVISOR | 402 |
| VF1A |  | LP1 | 403 |
| VF2A |  | LP3 | 404 |
| VF1B | LP2 | LP2 | 405 |
| VF2B | LP4 | LP4 | 406 |

FIG. 4

PARTITIONABLE ENDPOINT LOCK/OWNERSHIP TABLE 128-4

| PARTITIONABLE ENDPOINT (510) | LOCK HOLDER (512) | OWNER (514) | |
|---|---|---|---|
| C1 | HMC | HYPERVISOR | 501 |
| C2 | HYPERVISOR | HYPERVISOR | 502 |
| VF1A | HMC | LP1 | 503 |
| VF2A | HMC | LP3 | 504 |
| VF1B | LP2 | LP2 | 505 |
| VF2B | LP4 | LP4 | 506 |

FIG. 5

PARTITIONABLE ENDPOINT LOCK/OWNERSHIP TABLE 128-5

| PARTITIONABLE ENDPOINT (610) | LOCK HOLDER (612) | OWNER (614) | |
|---|---|---|---|
| C1 |  | HYPERVISOR | 601 |
| C2 | HYPERVISOR | HYPERVISOR | 602 |
| VF1A |  | LP1 | 603 |
| VF2A |  | LP3 | 604 |
| VF1B | LP2 | LP2 | 605 |
| VF2B | LP4 | LP4 | 606 |

FIG. 6

PARTITIONABLE ENDPOINT LOCK/OWNERSHIP TABLE 128-6

| PARTITIONABLE ENDPOINT (710) | LOCK HOLDER (712) | OWNER (714) | |
|---|---|---|---|
| C1 | HYPERVISOR | HYPERVISOR | 701 |
| C2 | HYPERVISOR | HYPERVISOR | 702 |
| VF1A |  | LP1 | 703 |
| VF2A |  | LP3 | 704 |
| VF1B | LP2 | LP2 | 705 |
| VF2B | LP4 | LP4 | 706 |

FIG. 7

| PARTITIONABLE ENDPOINT LOCK/ OWNERSHIP TABLE | | | 128-7 |
|---|---|---|---|
| PARTITIONABLE ENDPOINT (810) | LOCK HOLDER (812) | OWNER (814) | |
| C1 | HYPERVISOR | HYPERVISOR | 801 |
| C2 | HYPERVISOR | HYPERVISOR | 802 |
| VF1A | LP1 | LP1 | 803 |
| VF2A | LP3 | LP3 | 804 |
| VF1B | LP2 | LP2 | 805 |
| VF2B | LP4 | LP4 | 806 |

RETAINING OWNERSHIP OF A VIRTUAL FUNCTION WHILE AN ADAPTER IS REPLACED

FIELD

An embodiment of the invention generally relates to computer systems and more particularly concurrent maintenance of adapters that comprise virtual functions.

BACKGROUND

Computer systems typically comprise a combination of computer programs and hardware, such as semiconductors, transistors, chips, and circuit boards. The hardware within a computer system is typically organized into components, such as processors, storage devices, and I/O (Input/Output) devices. These components typically communicate with each other via another component called a bus.

Buses may be parallel buses, which carry data words or multiple bits in parallel on multiple wires, or serial buses, which carry data in bit-serial form. A bus may be point-to-point, meaning that the bus connects only two components, or multi-drop, meaning that more than two components are connected to the bus. One example of a computer bus is called PCI EXPRESS (PERIPHERAL COMPONENT INTERCONNECT EXPRESS), which uses a network of point-to-point serial links. PCI EXPRESS devices communicate via a logical connection called an interconnect or link. A link is a point-to-point communication channel between two PCI EXPRESS endpoints, allowing both to send/receive ordinary PCI-requests (e.g., configuration read/writes, I/O read/writes, and memory read/writes) and interrupts.

Endpoints may be assigned, owned, or locked by a logical partition (LPAR) or shared among multiple LPARs. An LPAR is a division of a computer's processors, memory, and storage into multiple sets of resources so that each set of resources may be operated independently with its own operating system instance and applications. Often, LPARs are used for different purposes such as database operation, client/server operation, to separate test and production environments, or the like. Each LPAR may communicate with other LPARs as if the other LPAR were a separate machine. Some resources may be shared amongst the LPARs. One such resource that may be shared is an I/O adapter using a technique called I/O virtualization.

SUMMARY

A method, computer-readable storage medium, and computer system are provided. In an embodiment, a power off command is received that specifies a slot in a computer that connects to a first adapter. The first adapter comprises a physical function and a virtual function. In response to the power off command, data transfer from a logical partition to the virtual function is stopped, a virtual function lock of the virtual function held by the logical partition is released, and the slot is powered off. Ownership of the virtual function is retained by the logical partition while the virtual function lock is released and the slot is powered off. After the powering off of the slot, a power on command is received that specifies the slot that connects to a second adapter. The second adapter comprises the physical function and the virtual function. In response to the power on command, the slot is powered on, and the virtual function lock is obtained of the virtual function for the logical partition.

It is to be noted, however, that the appended drawings illustrate only example embodiments of the invention, and are therefore not considered a limitation of the scope of other embodiments of the invention.

DETAILED DESCRIPTION

Figure 1:
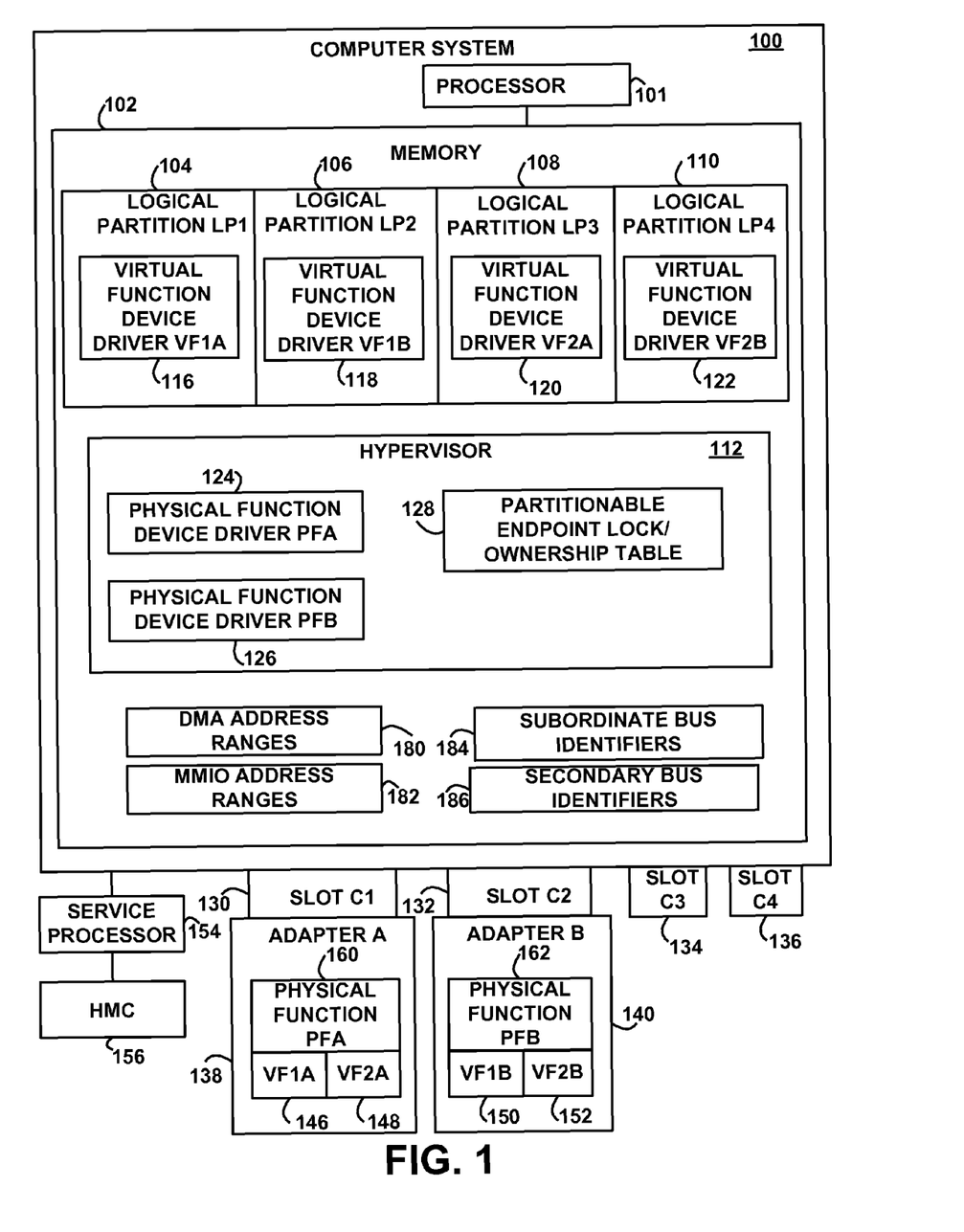
FIG. 1 depicts a high-level block diagram of an example system for implementing an embodiment of the invention.

Referring to the drawings, wherein like numbers denote like parts throughout the several views, FIG. 1 depicts a high-level block diagram representation of a computer system comprising a computer system 100 connected to an HMC (hardware management console) 156 via a service processor 154. The major components of the computer system 100 comprise one or more general-purpose programmable central processing units (CPUs) 101, herein generically referred to as the processor 101, connected to memory 102. In an embodiment, the computer system 100 contains multiple processors typical of a relatively large system; however, in another embodiment the computer system 100 may alternatively be a single processor system. Each processor 101 executes instructions stored in the memory 102 and may comprise one or more levels of on-board cache.

In an embodiment, the memory 102 may comprise a random-access semiconductor memory, storage devices, or storage mediums for storing or encoding data and programs. In another embodiment, the memory 102 represents the entire virtual memory of the computer system 100, and may also include the virtual memory of other computer systems coupled to the computer system 100. The memory 102 is conceptually a single monolithic entity, but in other embodiments the memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 102 stores or encodes logical partitions LP1 104, LP2 106, LP3 108, and LP4 110, a hypervisor 112, DMA (Direct Memory Address) address ranges 180, MMIO (Memory Mapped Input/Output) address ranges 182, subordinate bus identifiers 184, and secondary bus identifiers 186. Although the logical partitions LP1 104, LP2 106, LP3 108, and LP4 110, the hypervisor 112, the DMA address ranges 180, the MMIO address ranges 182, the subordinate bus identifiers 184, and the secondary bus identifiers 186 are illustrated as being contained within the memory 102 in the computer system 100, in other embodiments some or all of them may be on different computer systems and may be accessed remotely, e.g., via a network. The computer system 100 may use virtual addressing mechanisms that allow the programs of the computer system 100 to behave as if they only have access to a large, single storage entity instead of access to multiple, smaller storage entities. Thus, while the logical partitions LP1 104, LP2 106, LP3 108, and LP4 110, the hypervisor 112, the DMA address ranges 180, the MMIO address ranges 182, the subordinate bus identifiers 184, and the secondary bus identifiers 186 are illustrated as being contained within the memory 102, these elements are not necessarily all completely contained in the same storage device at the same time. Further, although the logical partitions LP1 104, LP2 106, LP3 108, and LP4 110, the hypervisor 112, the DMA address ranges 180, the MMIO address ranges 182, the subordinate bus identifiers 184, and the secondary bus identifiers 186 are illustrated as being separate entities, in other embodiments some of them, portions of some of them, or all of them may be packaged together.

In an embodiment, the logical partitions LP1 104, LP2 106, LP3 108, and LP4 110 and the hypervisor 112 comprise instructions or statements that execute on the processor 101 or instructions or statements that are interpreted by instructions or statements that execute on the processor 101, to carry out the functions as further described below with reference to FIGS. 2, 3, 4, 5, 6, 7, 8, 9, and 10. In another embodiment, the logical partitions LP1 104, LP2 106, LP3 108, and LP4 110 and the hypervisor 112 are implemented in hardware via semiconductor devices, chips, logical gates, circuits, circuit cards, and/or other physical hardware devices in lieu of, or in addition to, a processor-based system. In an embodiment, the logical partitions LP1 104, LP2 106, LP3 108, and LP4 110 and/or the hypervisor 112 comprise data in addition to instructions or statements. The logical partitions LP1 104, LP2 106, LP3 108, and LP4 110 comprise virtual function device drivers VF1A 116, VF1B 118, VF2A 120, and VF2B 122, respectively. The hypervisor 112 comprises a physical function device driver PFA 124, a physical function device driver PFB 126, and a partitionable endpoint lock/ownership table 128.

In logical partitioning, a single physical computer system operates essentially like multiple and independent virtual computers, referred to as the logical partitions 104, 106, 108, or 110. Each logical partition 104, 106, 108, or 110 executes a separate operating system (which may the same or different from each other), and from the perspective of users and of the applications executing in the logical partition, operates as a fully independent computer. The various resources in the physical computer system 100 are allocated among the various logical partitions 104, 106, 108, or 110 via the hypervisor 112. The resources may include the processors 101, the adapters 138 or 140, virtual or physical functions in the adapters 138 or 140, input/output devices, network bandwidth, and the memory 102. The physical memory of a computer system is typically allocated among various logical partitions 104, 106, 108, or 110 using a technique known as virtual memory. Virtual memory gives each logical partition 104, 106, 108, or 110 the impression or view that it is accessing contiguous memory within a range of contiguous virtual addresses, also known as an address space, but in fact the memory pieces that each logical partition 104, 106, 108, or 110 accesses may be physically fragmented and non-contiguous, meaning that they are scattered at various locations at non-contiguous physical addresses in the physical memory and may overflow to secondary storage, such as disk drives, which are typically larger and slower than memory.

The computer system 100 comprises slots C1 130, C2 132, C3 134, and C4 136. The slot C1 130 is connected to an adapter A 138, and the slot C2 132 is connected to an adapter B 140. The slots 130, 132, 134, and 136 comprise electrical connectors and/or buses. The adapters 138 and 140 comprise circuit boards, cards, integrated circuits, logic devices, any other appropriate hardware, or any combination, portion, or multiple thereof. The adapter A 138 comprises a physical function PFA 160 and virtual functions VF1A 146 and VF2A 148. The adapter B 140 comprises a physical function PFB 162 and virtual functions VF1B 150 and VF2B 152.

A physical function 160 or 162 is an addressable entity that represents a physical resource and is used or specified by transactions, commands, or requests to access the represented physical resource. In an embodiment, a physical function 160 or 162 is implemented as a set of logic that is represented by a single configuration space. In other words, the physical functions 160 and 162 are configurable based on configuration data stored in the physical functions 160 or 162 or associated configuration space in the memory of the respective adapter 138 and 140. The computer system 100 sends the configuration data to the respective adapter 138 or 140, and that adapter 138 or 140 uses that configuration data to alter the interface provided by the physical function 160 or 162 or to alter the actions taken by the physical function 160 or 162 in response to commands, transactions, or requests sent by the computer system 100 to the physical function 160 or 162 of the respective adapter 138 or 140. Examples of physical resources include ingress ports, egress ports, circuit logic, work queues, data buffers, and units of memory or storage. Examples of operations that physical functions 160 or 162 may perform include, but are not limited to adapter level initialization, reset, recovery, and offload engine operations.

The virtual functions 146, and 148 are addressable entities, identifiers, names, or numbers that share physical resources implemented by the same physical function 160, and the virtual functions 150 and 152 are addressable entities, identifiers, names, or numbers that share physical resources implemented by the same physical function 162. Different requesters (e.g., different virtual function device drivers 116, 118, 120, and 122 or different operating systems or applications in the logical partitions 104, 106, 108, and 110) specify different of the virtual functions 146, 148, 150, or 152 in their respective transaction, commands, or requests that they send to the adapters 138 and 140, which request access to the shared physical functions 160 and 162 and the represented physical resources. These different virtual functions specified by the different requesters allow the different requesters to share the same physical functions 160 and 162, allow the adapters 138 and 140 to distinguish between commands, requests, or transactions that arrive from different requesters, and allow different requesters to access different memory spaces within the adapter 138 and 140, receive different interrupts from the adapters 138 and 140, and send and receive different DMA data streams to/from the adapters 138 and 140.

In an embodiment, the physical resources allocated to a particular virtual function are not shared with any other virtual function; that is, the physical resources represented by a particular virtual function are exclusively allocated to one virtual function 146, 148, 150, or 152. In another embodiment, the physical resources allocated to one virtual function 146, 148, 150, or 152 may be allocated to another virtual function, at the same time (concurrently) or at a different time (non-concurrently).

Each of the logical partitions 104, 106, 108, and 110 is assigned its own DMA ranges 180, MMIO address ranges 182, subordinate bus identifiers 184, and secondary bus identifiers 186, which may be different from each other. The DMA address ranges 180 and the MMIO address ranges 182 are generically referred to as data transfer address ranges. One way of transferring data between the computer system 100 and the adapters 138 and 140 is via DMA, which transfers data independently of the processor 101, so that the processor 101 does not wait for the data transfer to complete. The DMA address ranges specify addresses in memory accessed by the adapters 138 and 140 to/from which the virtual function device drivers 116, 118, 120, and 122 and/or physical function device drivers 124 and 126 transfer data.

Another way of transferring data is via MMIO, in which the processor 101 maps memory addresses in an adapter 138 or 140 (or in an I/O device connected to the adapter 138 or 140) into the processor's address space in the memory 102. Areas of the processor's addressable space in the memory 102 are reserved for I/O to/from the adapters 138 or 140. This reservation may be either temporary or permanent. Each adapter 138 and 140 monitors the bus to which its respective slot C1 130 or the slot C2 132 connects and responds to any processor's read/write from/to the adapter-assigned address space in the memory 102. Thus, if the processor issues a read instruction to the adapter-assigned address space in the memory 102, the adapter 138 or 140 receives the instruction from the bus or slot C1 130 or the slot C2 132 and transmits the data (onto the bus) that is located at the corresponding address within the adapter 138 or 140 (or within an I/O device connected to the adapter 138 or 140). Similarly, if the processor issues a write instruction to the adapter-assigned address space in the memory 102, the adapter 138 or 140 receives the data from the bus and writes it to the corresponding address within the adapter 138 or 140 (or within an I/O device connected to the adapter 138 or 140). In some MMIO schemes, the processor instructions that read/write from/to the adapter-assigned address space in memory are the same instructions that read/write from/to memory in address spaces that are not reserved for the adapters 138 or 140. In other MMIO schemes, the processor instructions that read/write from/to the adapter-assigned address space in memory are different instructions from those that read/write from/to memory in address spaces that are not reserved for the adapters 138 or 140.

The MMIO address ranges 182 specify ranges or extents of MMIO addresses that the logical partitions 104, 106, 108, or 110 in the computer system 100 may use to address or access the memory of the adapters 138 or 140. The adapters 138 or 140 are connected to the slot C1 130 or the slot C2 132 and the computer system 100 via a bus or buses whose bus identifiers are encompassed by, or are within, the bus range specified by the subordinate bus identifiers 184 and the secondary bus identifiers 186. The MMIO address ranges 182 specify a beginning (lower bound or memory base) of the respective range and an end (upper bound or memory limit) of the respective range. The memory base is less than the memory limit. The values in the MMIO address ranges 182 are unique within the computer system 100 that assigns them.

The secondary bus identifiers 186 identify the respective first bus that is immediately downstream from the slot C1 130 or the slot C2 132 and that connects to the slot C1 130 or the slot C2 132. The subordinate bus identifiers 184 specify the highest (largest) respective bus identifier of all of the buses that can be reached downstream of the slot C1 130 or the slot C2 132. In various embodiments, buses that can be reached (are reachable) downstream of the slot C1 130 or the slot C2 132 are connected directly to the slot C1 130 or the slot C2 132 or indirectly through bridges. Downstream refers to a relative physical position of a component (either a bus, an adapter 138 or 140, or an I/O device) that is farther from the computer system 100 than is the relative position of a component that is upstream, or nearer the computer system 100.

In various embodiments, the computer system 100 is a multi-user mainframe computer system, a single-user system, or a server computer or similar device that has little or no direct user interface, but receives requests from other computer systems (clients). In other embodiments, the computer system 100 is implemented as a desktop computer, portable computer, laptop or notebook computer, tablet computer, pocket computer, telephone, smart phone, pager, automobile, teleconferencing system, appliance, or any other appropriate type of electronic device.

In an embodiment, the service processor 154 and/or the HMC 156 may comprise some or all of the elements of the computer system 100. In another embodiment, the functions of the service processor 154 and/or the HMC 156 may be performed by the computer system 100. The HMC 156 comprises one or more user I/O devices, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device and the computer system 100, and may receive output data via the user output devices. For example, a user interface may be presented via a user I/O device, such as displayed on a display device, played via a speaker, or printed via a printer.

FIG. 1 depicts the representative major components of the computer system 100. But, individual components may have greater complexity than represented in FIG. 1, components other than or in addition to those shown in FIG. 1 may be present, and the number, type, and configuration of the components may vary. Several particular examples of such additional complexity or additional variations are disclosed herein; these are by way of example only and are not necessarily the only such variations. The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs."

The computer programs comprise one or more instructions or statements that are resident at various times in various memory and storage devices in the computer system 100 and that, when read and executed by one or more processors in the computer system 100 or when interpreted by instructions that are executed by one or more processors, cause the computer system 100 to perform the actions necessary to execute steps or elements comprising the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk, a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, radio frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, non-profit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments the invention.

Figure 2:
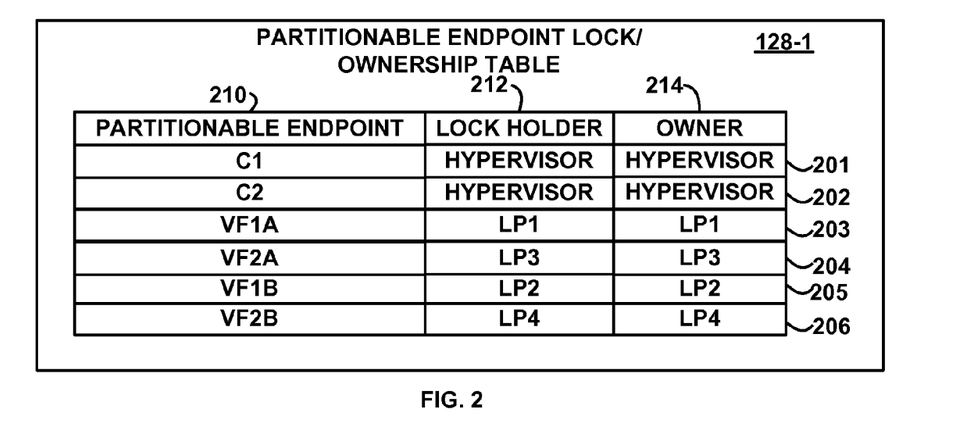
FIG. 2 depicts a block diagram of an example initial state of a partitionable endpoint lock/ownership table, according to an embodiment of the invention.

FIG. 2 depicts a block diagram of an example initial state of the partitionable endpoint lock/ownership table 128-1, according to an embodiment of the invention. The partitionable endpoint lock/ownership table 128-1 is an example of, and is generically referred to by, the partitionable endpoint lock/ownership table 128 (FIG. 1). The partitionable endpoint lock/ownership table 128-1 comprises example entries 201, 202, 203, 204, 205, and 206, each comprising an example partitionable endpoint field 210, a lock holder field 212, and an owner field 214. The partitionable endpoint field 210 identifies a partitionable endpoint that is capable of being owned or locked by a logical partition. Examples of partitionable endpoints include the slots 130, 132, 134, or 136 and the virtual functions 146, 148, 150, or 152. The lock holder field 212 identifies a lock holder (either the HMC 156, the hypervisor 112, or the logical partitions 104, 106, 108, or 110) that has locked the partitionable endpoint that is identified in the same entry. The owner field 214 identifies an owner (either the hypervisor 112 or the logical partitions 104, 106, 108, or 110) that owns the partitionable endpoint that is identified in the same entry.

While a partitionable entity is owned by an owner, the DMA address range 180, the MMIO address range 182, the subordinate bus identifier 184, and the secondary bus identifier 186 that are assigned to that partitionable entity, and which the owner and lock holder use to transfer data and commands to/from the partitionable entity, do not change. While a partitionable entity is locked by a lock holder, only the lock holder is allowed to send commands/data to the partitionable entity, whether or not the lock holder is the owner of the partitionable entity.

In an embodiment, each logical partition owns one virtual function, but in other embodiments, the logical partitions 104, 106, 108, or 110 may own more than one virtual function. In the example state illustrated by the partitionable endpoint lock/ownership table 128-1, the logical partitions LP1 104 and LP3 108 own virtual functions in the adapter A 138 (virtual function VF1A 146 and virtual function VF2A 148, respectively). The logical partitions LP2 106 and LP4 110 own virtual functions from the adapter B 140 (the virtual function VF1B 150 and the virtual function VF2B 152, respectively). For clarity, the partitionable endpoint lock/ownership table 128-1 illustrates only those partitionable endpoints that are relevant to the example. In another embodiment, the partitionable endpoint lock/ownership table 128 may identify all partitionable endpoints connected to the computer system 100, such as the slot C3 134 and the slot C4 136. In response to I/O virtualization being enabled for an adapter 138 or 140 connected to the slot C1 130 or the slot C2 132, the hypervisor 112 obtains ownership of the slot C1 130 or the slot C2 132 and locks the slot C1 130 or the slot C2 132 (as illustrated by the identification of the hypervisor in the entries 201 and 202). If an adapter 138 or 140 does not support I/O virtualization or if the adapter 138 or 140 is used in non-I/O virtualization mode, a logical partition 104, 106, 108, or 110 owns and locks the slot C1 130 or the slot C2 132 to which the adapter 138 or 140 connects.

Figure 3:
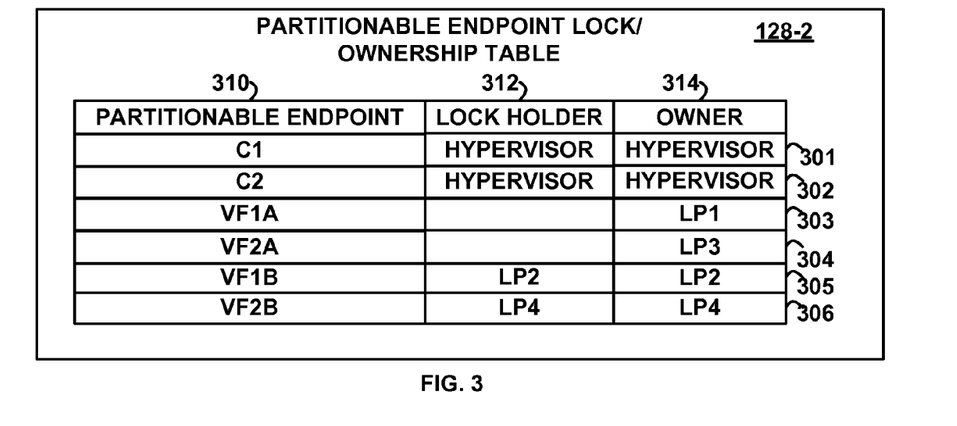
FIG. 3 depicts a block diagram of an example state of a partitionable endpoint lock/ownership table while an adapter is undergoing a concurrent repair procedure, according to an embodiment of the invention.

FIG. 3 depicts a block diagram of an example first state (subsequent to the initial state of FIG. 2) of a partitionable endpoint lock/ownership table 128-2 while an adapter is undergoing a concurrent repair procedure, according to an embodiment of the invention. The partitionable endpoint lock/ownership table 128-2 is an example of, and is generically referred to by, the partitionable endpoint lock/ownership table 128 (FIG. 1). The partitionable endpoint lock/ownership table 128-2 comprises example entries 301, 302, 303, 304, 305, and 306, each comprising an example partitionable endpoint field 310, a lock holder field 312, and an owner field 314.

In response to an example request to power off the adapter A 138, the HMC 156 sends vary off commands to the logical partitions that own the virtual functions implemented by the adapter 138, specifically the logical partitions LP1 104 and LP3 108 that own virtual functions VF1A 146 and VF2A 148, respectively. In response to receiving the vary off commands, the logical partitions 104 and 108 deactivate, quiesce, and/or shutdown their respective virtual function device drivers 116 and 120 and call the hypervisor 112, requesting the relinquishing of control of those virtual function device drivers. Deactivating the virtual function device drivers 116 and 120 causes the virtual function device drivers 116 and 120 to stop sending commands and/or data to/from the respective virtual functions VF1A 146 and VF2A 148. In response to the calls, the hypervisor 112 clears the lock holder fields 312 in the entries 303 and 304 for those virtual functions, indicating that the logical partitions LP1 104 and LP3 108 have relinquished control of the virtual functions VF1A 146 and VF2A 148, no longer lock the virtual functions VF1A 146 and VF2A 148, and no longer send commands/data to the virtual functions VF1A 146 and VF2A 148. Despite no longer locking the virtual functions VF1A 146 and VF2A 148, the respective logical partitions LP1 104 and LP3 108 maintain ownership of the virtual functions VF1A 146 and VF2A 148, as indicated by the owner field 314 in the entries 303 and 304.

Figure 4:
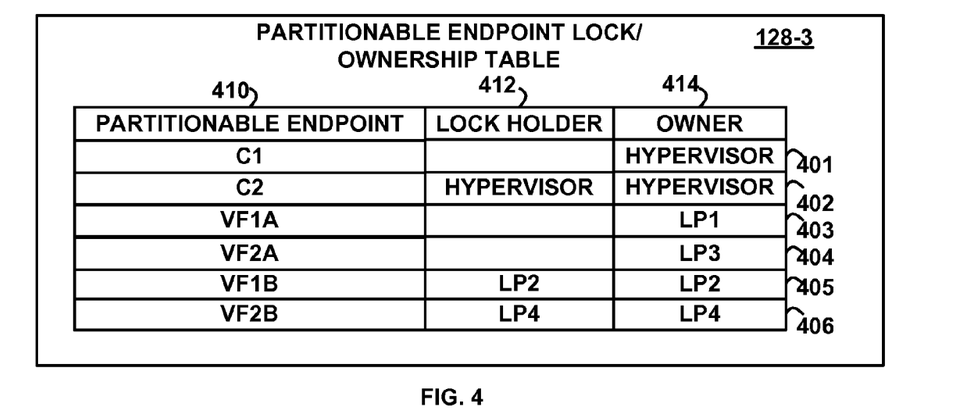
FIG. 4 depicts a block diagram of an example state of a partitionable endpoint lock/ownership table while an adapter is undergoing a concurrent repair procedure, according to an embodiment of the invention.

FIG. 4 depicts a block diagram of an example state (subsequent to the state of FIG. 3) of a partitionable endpoint lock/ownership table 128-3 while an adapter is undergoing a concurrent repair procedure, according to an embodiment of the invention. The partitionable endpoint lock/ownership table 128-3 is an example of, and is generically referred to by, the partitionable endpoint lock/ownership table 128 (FIG. 1). The partitionable endpoint lock/ownership table 128-3 comprises example entries 401, 402, 403, 404, 405, and 406, each comprising an example partitionable endpoint field 410, a lock holder field 412, and an owner field 414.

The HMC 156 sends a vary off command to the hypervisor 112. The vary off command specifies the hardware resource that is the target of the concurrent repair procedure, which in this example is the adapter A 138 connected to the slot C1 130. In response to receiving the vary off command, the hypervisor 112 deactivates, quiesces, and/or shuts down the physical function 160 implemented by the adapter 138, meaning that the hypervisor 112 stops sending any commands or data to the physical function 160 and/or instructs the physical function 160 to stop data transfer and stop the processing of any commands. The hypervisor 112 then clears the lock holder field 412 in the entry 401, indicating that the hypervisor 112 has relinquished control of the slot C1 and no longer has the slot C1 130 locked, but the hypervisor 112 remains the owner of the slot C1 130.

Figure 5:
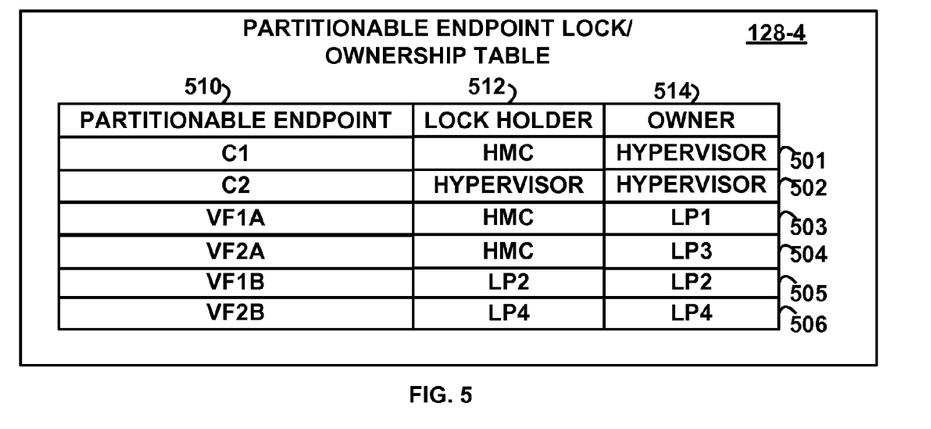
FIG. 5 depicts a block diagram of an example state of a partitionable endpoint lock/ownership table while an adapter is undergoing a concurrent repair procedure, according to an embodiment of the invention.

FIG. 5 depicts a block diagram of an example state (subsequent to the state of FIG. 4) of a partitionable endpoint lock/ownership table 128-4 while an adapter is undergoing a concurrent repair procedure, according to an embodiment of the invention. The partitionable endpoint lock/ownership table 128-4 is an example of, and is generically referred to by, the partitionable endpoint lock/ownership table 128 (FIG. 1). The partitionable endpoint lock/ownership table 128-4 comprises example entries 501, 502, 503, 504, 505, and 506, each comprising an example partitionable endpoint field 510, a lock holder field 512, and an owner field 514.

The HMC 156 sends an acquire service lock command to the hypervisor 112. The acquire service lock command specifies the hardware resource that is the target of the concurrent repair procedure, which in this example is the adapter A 138, which is connected to the slot C1 130. In response to receiving the acquire service lock command, the hypervisor 112 sets the lock holder field 512 in the entries 501, 503, and 504 for the slot C1 130 and the virtual functions implemented by the adapter A 138 that connected to the slot C1 130, indicating that the HMC 156 has acquired control of and locked the slot C1 130 and the virtual functions VF1A 146 and VF2A 148. But, the hypervisor 112 remains the owner of the slot C1 130, the logical partition LP1 104 remains the owner of the virtual function VF1A 146, and the logical partition LP3 108 remains the owner of the virtual function VF2A 148, as illustrated by the entries 501, 503, and 504.

The HMC 156 sends a power off power domain command to the hypervisor 112. The power off domain command specifies the hardware resource that is the target of the concurrent repair procedure, which in this example is the slot C1 130, which connects to the adapter A 138. In response to receiving the power off power domain command, the hypervisor 112 verifies that the entity requesting the power off via the power off domain commend (the entity is the HMC 156 in this example) has control of and has locked the target resources. The hypervisor 112 performs this verification by comparing the identifier of the requesting entity (the identifier of the HMC 156) to the identifier specified by the lock holder field 512 in the entries 501, 503, and 504 for the slot C1 130 and the virtual functions VF1A 146 and VF2A 148. If the HMC 156 is the lock holder of the locks on the slot C1 130 and the adapter A 138 that is connected to the slot C1 130, then the hypervisor 112 powers off the slot to which the adapter A 138 connects, meaning that the hypervisor 112 stops electrical power to the slot C1 130. If the HMC 156 is not the lock holder of the locks on the slot C1 and the adapter A 138, then the hypervisor 112 does not power off the slot and instead returns an error to the requesting HMC 156. After the hypervisor 112 has stopped electrical power to the slot C1, a user physically removes the old adapter A from the slot C1 130 and physically inserts a replacement adapter A into the slot C1 130. The replacement adapter, which may be the same or a different adapter than the old adapter that was physically removed by the user, is also named the adapter A. In an embodiment, if the replacement adapter is a different adapter, then the two different adapters have a same type, support a same protocol, or support the same virtual functions and physical functions. In an embodiment, the user does not remove or replace adapters; instead, the power is cycled on and off to the same adapter.

After the user replaced the adapter, the HMC 156 sends a power on power domain command to the hypervisor 112 for the hardware resource that is the target of the concurrent repair procedure, specifically the slot C1 130, which connects to the adapter A 138. In response to receiving the power on power domain command, the hypervisor 112 verifies that the entity (the HMC 156) requesting the power on has control of and has locked the target resources based on verifying that the identifier of the requesting entity matches the identifier specified by the lock holder field 512 in the entries 501, 503, and 504 whose partitionable endpoint fields 510 specifies identifiers that match the slot to which the target resource is connected and the virtual functions implemented by the target resource. If the HMC 156 has locked the slot C1 and the virtual functions VF1A 146 and VF2A 148, then the hypervisor 112 powers on the slot C1 130 to which the adapter A 138 is connected. Otherwise, the hypervisor 112 returns an error to the HMC 156 and does not power on the slot C1 130.

Figure 6:
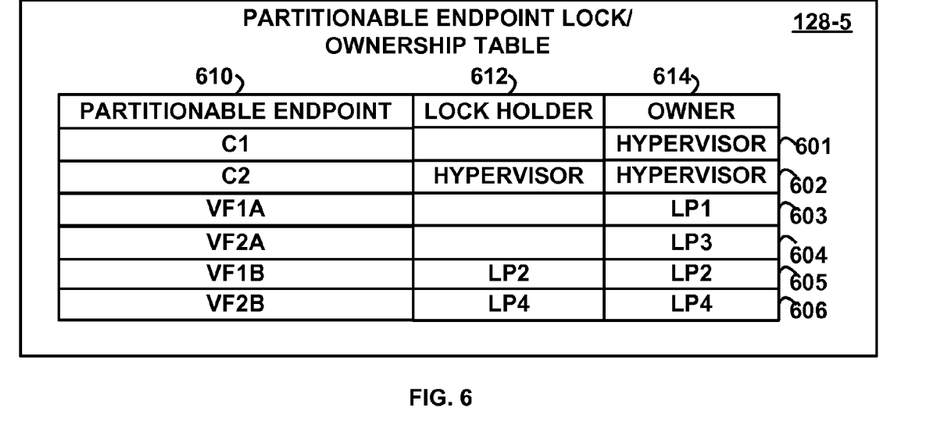
FIG. 6 depicts a block diagram of an example state of a partitionable endpoint lock/ownership table while an adapter is undergoing a concurrent repair procedure, according to an embodiment of the invention.

FIG. 6 depicts a block diagram of an example state (subsequent to the state of FIG. 5) of a partitionable endpoint lock/ownership table 128-5 while an adapter is undergoing a concurrent repair procedure, according to an embodiment of the invention. The partitionable endpoint lock/ownership table 128-5 is an example of, and is generically referred to by, the partitionable endpoint lock/ownership table 128 (FIG. 1). The partitionable endpoint lock/ownership table 128-5 comprises example entries 601, 602, 603, 604, 605, and 606, each comprising an example partitionable endpoint field 610, a lock holder field 612, and an owner field 614.

The HMC 156 sends a release service lock command to the hypervisor 112. The release service lock command specifies the hardware resource that is the target of the concurrent repair procedure, which in this example is the slot C1 130, which connects to the adapter A 138. In response to receiving the release service lock command, the hypervisor 112 clears the lock holder field 612 in the entry 601 for the slot and entries 603 and 604 for the virtual functions VF1A 146 and VF2A 148 implemented by the adapter A 138 connected to the slot C1 130, indicating that the HMC 156 has relinquished control and no longer locks the slot C1 130 and the virtual functions VF1A 146 and VF2A 148.

Figure 7:
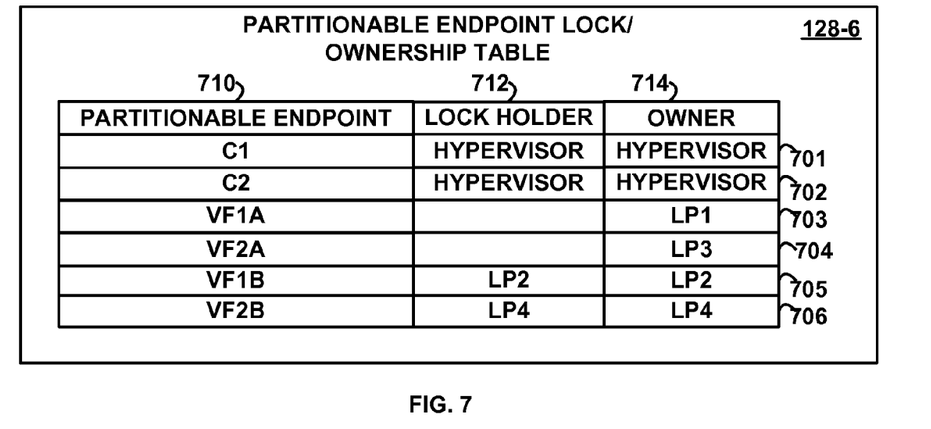
FIG. 7 depicts a block diagram of an example state of a partitionable endpoint lock/ownership table while an adapter is undergoing a concurrent repair procedure, according to an embodiment of the invention.

FIG. 7 depicts a block diagram of an example state (subsequent to the state of FIG. 6) of a partitionable endpoint lock/ownership table 128-6 while an adapter is undergoing a concurrent repair procedure, according to an embodiment of the invention. The partitionable endpoint lock/ownership table 128-6 is an example of, and is generically referred to by, the partitionable endpoint lock/ownership table 128 (FIG. 1). The partitionable endpoint lock/ownership table 128-6 comprises example entries 701, 702, 703, 704, 705, and 706, each comprising an example partitionable endpoint field 710, a lock holder field 712, and an owner field 714.

The HMC 156 sends a vary on command to the hypervisor 112. The vary on command specifies the hardware resource that is the target of the concurrent repair procedure, which in this example is the slot C1 130, which connects to the adapter A 138. In response to receiving the vary on command, the hypervisor 112 sets the lock holder field 712 in the entry 701 for the slot C1 130 to indicate that the hypervisor 112 has locked the slot C1 130. The hypervisor 112 then activates and initializes the physical function PFA 160 in the adapter 138, which is connected to the slot C1 130. Activating and initializing the physical function PFA 160 comprises setting configuration parameters in the physical function PFA 160, in order to prepare the physical function PFA 160 for receiving commands and data.

Figure 8:
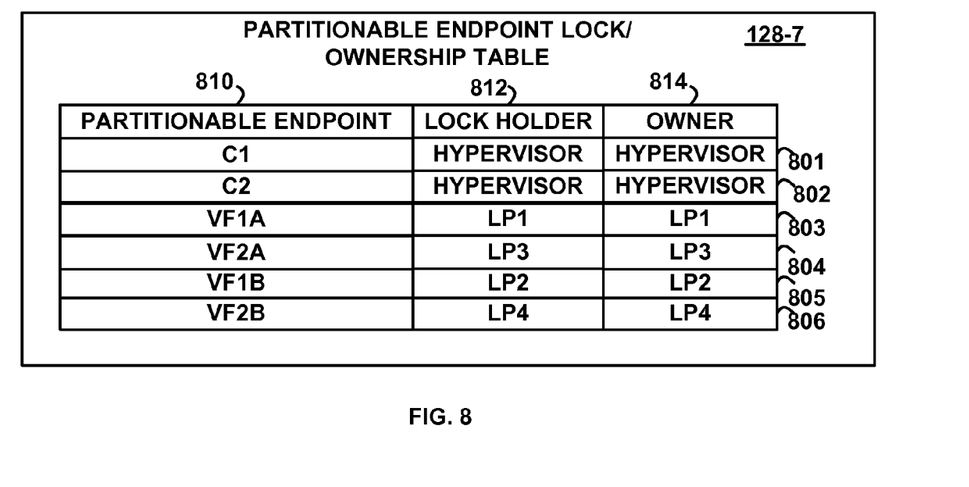
FIG. 8 depicts a block diagram of an example state of a partitionable endpoint lock/ownership table while an adapter is undergoing a concurrent repair procedure, according to an embodiment of the invention.

FIG. 8 depicts a block diagram of an example state (subsequent to the state of FIG. 7) of a partitionable endpoint lock/ownership table 128-7 while an adapter is undergoing a concurrent repair procedure, according to an embodiment of the invention. The partitionable endpoint lock/ownership table 128-7 is an example of, and is generically referred to by, the partitionable endpoint lock/ownership table 128 (FIG. 1). The partitionable endpoint lock/ownership table 128-7 comprises example entries 801, 802, 803, 804, 805, and 806, each comprising an example partitionable endpoint field 810, a lock holder field 812, and an owner field 814.

The HMC 156 sends vary on commands to the logical partitions that own the virtual functions implemented by the target adapter. In this example, the logical partitions LP1 104 and LP3 108 that own the virtual function VF1A 146 and the virtual function VF2A 148, respectively in the target adapter A 138. In response to receiving the vary on commands, the logical partitions LP1 104 and LP3 108 call the hypervisor 112 and request acquiring control of the respective virtual functions VF1A 146 and VF2A 148. In response to the call and request, the hypervisor 112 sets the lock holder field 812 in the entries 803 and 804 for those virtual functions, indicating that the logical partitions LP1 104 and LP3 108 have locked the respective virtual functions VF1A 146 and VF2A 148. In response to successful completion of the call to the hypervisor 112, the logical partitions LP1 104 and LP3 108 activate and initialize the respective virtual functions 146 and 148. Activating and initializing the respective virtual functions 146 and 148 comprises sending configuration parameters to the virtual functions 146 and 148, which are stored in the virtual functions and which affect or alter the processing of future commands sent to the virtual functions. The logical partitions LP1 104 and LP3 108 that own and that have locked the respective virtual functions VF1A 146 and VF2A 148 in the new adapter (as indicated by the lock holder field 812 and the owner field 814 in the entries 803 and 804 in the partitionable endpoint lock/ownership table 128-7) may now send commands and/or data to the respective virtual functions VF1A 146 and VF2A 148 in the replacement adapter in the slot C1 130 via the same DMA address ranges 180, MMIO address ranges 182, subordinate bus numbers 184, and secondary bus numbers 186, as the logical partitions 104 and 108 used when sending commands and/or data to the old adapter that was replaced in the slot C1 130. Thus, in an embodiment, the HMC 156 services an adapter without fully unassigning ownership of the adapter and its virtual functions from a logical partition. Fully unassigning ownership of the virtual functions from the owning partitions might expose the computer system 100 to unwanted partition configuration changes during the service procedure, such as automated workload/provisioning managers seeing available (not owned by any logical partition) virtual functions and giving ownership of them to another logical partition, which could require manual user intervention to correct.

Figure 9:
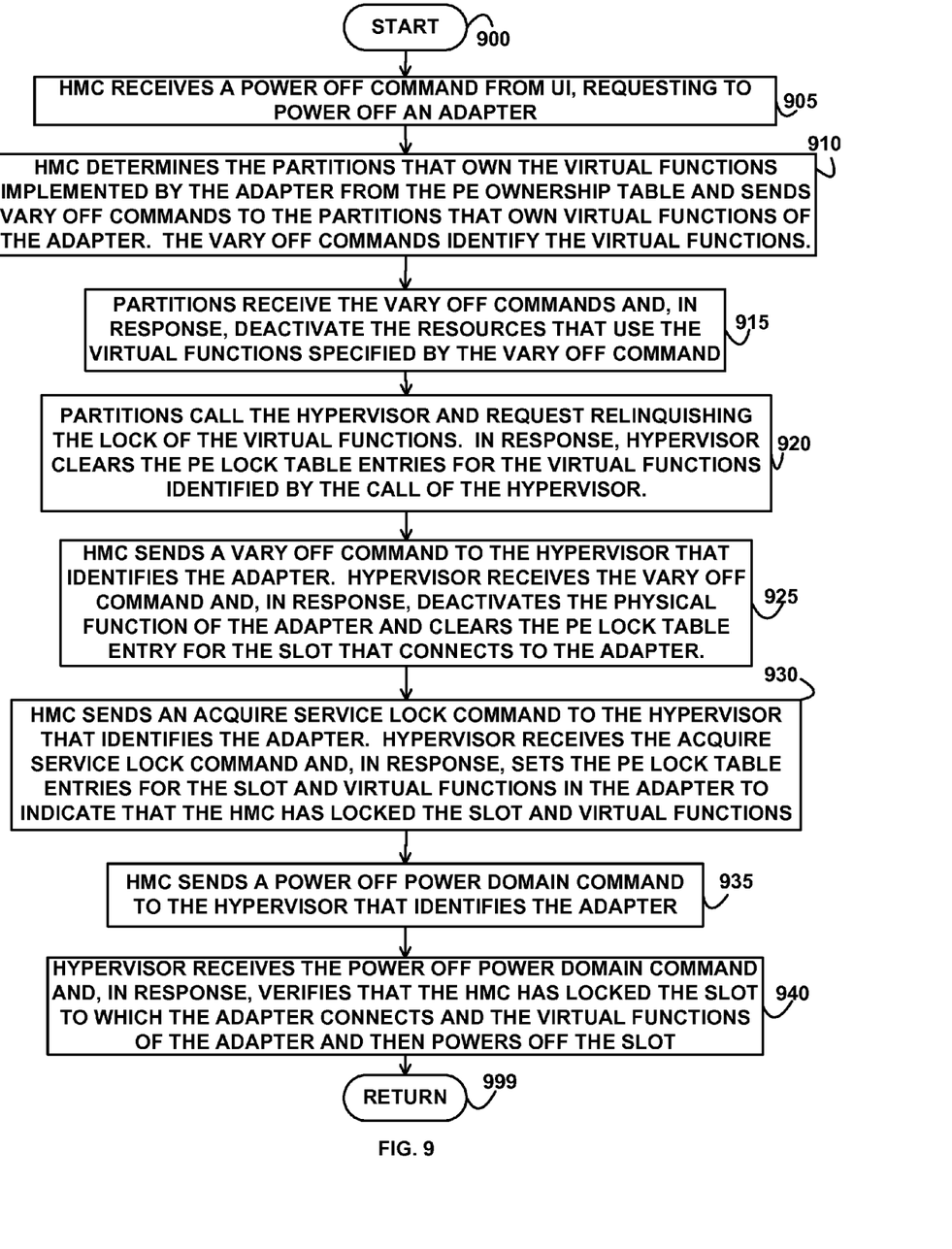
FIG. 9 illustrates a flowchart of example processing for powering off an adapter, according to an embodiment of the invention.

FIG. 9 illustrates a flowchart of example processing for powering off an adapter, according to an embodiment of the invention. Control begins at block 900. Control then continues to block 905 where the HMC 156 receives a power off command from a user interface at a user I/O device to power off a slot specified by the power off command, to which a target adapter 138 or 140 connects. Control then continues to block 910 where, in response to the request, the HMC 156 determines the logical partitions 104, 106, 108, or 110 that own the virtual functions 146, 148, 150, or 152 implemented by the target adapter 138 or 140 from the partitionable endpoint lock/ownership table 128 and sends vary off commands to the logical partitions 104, 106, 108, or 110 that own the virtual functions 146, 148, 150 or 152 implemented by the target adapter 138 or 140. The vary off commands identify the virtual functions 146, 148, 150, or 152.

Control then continues to block 915 where the logical partitions 146, 148, 150, or 152 receive the vary off commands and, in response, deactivate the resources (the virtual function device drivers 116, 118, 120, or 122 in the respective logical partitions 104, 106, 108, or 110) that use (that send commands and data to) the virtual functions 146, 148, 150, or 152 specified by the vary off command. The deactivation stops the virtual function devices drivers from sending commands and/or data to the virtual functions specified by the vary off command. Control then continues to block 920 where the logical partitions 104, 106, 108, or 110 call the hypervisor 112 and request relinquishing the lock (unlocking) of the virtual functions 146, 148, 150, or 152. In response, the hypervisor 112 clears the lock holder field in the partitionable endpoint lock/ownership table entries for the virtual functions 146, 148, 150, or 152 identified by the call of the hypervisor 112, indicating that the locks are released or unlocked and that no entity holds a lock of the virtual functions 146, 148, 150, or 152.

Control then continues to block 925 where the HMC 156 sends a vary off command to the hypervisor 112 that identifies the slot to which the target adapter 138 or 140 connects. The hypervisor 112 receives the vary off command and, in response, deactivates the physical function 160 or 162 of the target adapter 138 or 140 and clears the lock holder field in the partitionable endpoint lock/ownership table entry for the slot C1 130 or the slot C2 132 that connects to the target adapter 138 or 140, indicating that the locks are released and that no entity holds a lock on the slot C1 130 or the slot C2 132. Deactivating the physical functions stops the physical functions from transferring data and performing commands. Control then continues to block 930 where the HMC 156 sends an acquire service lock command (which identifies the target slot to which the target adapter 138 or 140 connects) to the hypervisor 112. The hypervisor 112 receives the acquire service lock command and, in response, sets the partitionable endpoint lock table entries for the slot C1 130 or the slot C2 132 and virtual functions 146, 148, 150, or 152 in the adapter 138 or 140 to indicate that the HMC 156 has locked the slot C1 130 or the slot C2 132 and the virtual functions 146, 148, 150, or 152.

Control then continues to block 935 where the HMC 156 sends a power off power domain command, which identifies the target slot (to which the target adapter 138 or 140 connects) to the hypervisor 112. Control then continues to block 940 where the hypervisor 112 receives the power off power domain command and, in response, verifies that the HMC 156 has locked the slot C1 130 or the slot C2 132 to which the target adapter 138 or 140 connects and verifies that the HMC 156 has locked the virtual functions 146, 148, 150, or 152 of the adapter 138 or 140 and then powers off the slot C1 130 or the slot C2 132 if the HMC 156 has locked the slot C1 130 or the slot C2 132. Control then continues to block 999 where the logic of FIG. 9 returns. After the processing of the logic of FIG. 9, the user may physically remove the powered-off target adapter from its slot.

Figure 10:
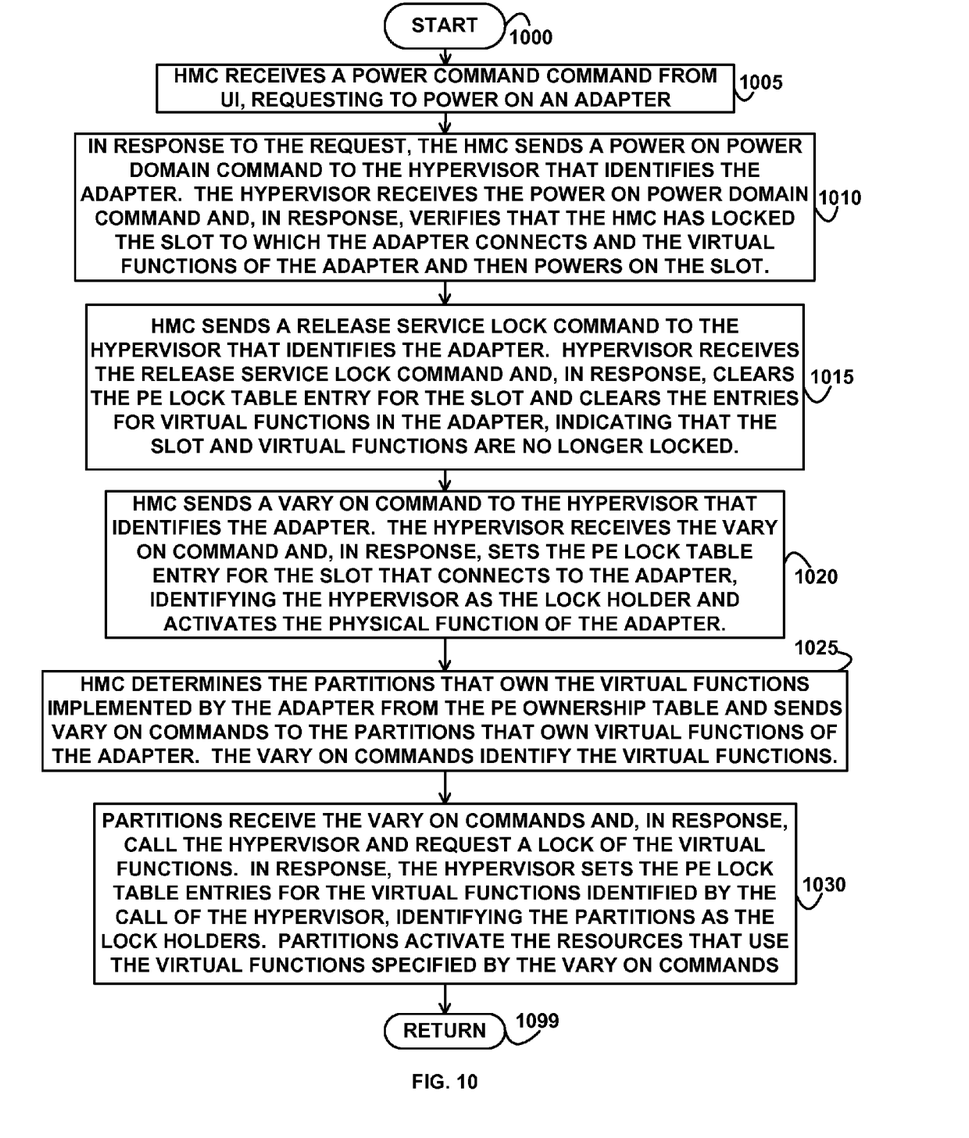
FIG. 10 illustrates a flowchart of example processing for powering on an adapter, according to an embodiment of the invention.

FIG. 10 illustrates a flowchart of example processing for powering on an adapter, according to an embodiment of the invention. In an embodiment, the logic of FIG. 10 is executed after the user has replaced an old adapter in a slot with the replacement target adapter in the slot. Control begins at block 1000. Control then continues to block 1005 where the HMC 156 receives a power on command from a user interface at a user I/O device to power on a target slot (to which a target replacement adapter 138 or 140 connects) specified by the power on command. Control then continues to block 1010 where, in response to the request, the HMC 156 sends a power on power domain command to the hypervisor 112 that identifies the replacement adapter 138 or 140. The hypervisor 112 receives the power on power domain command and, in response, verifies that the HMC 156 has locked the slot C1 130 or the slot C2 132 to which the adapter 138 or 140 connects and the virtual functions 146, 148, 150, or 152 of the adapter 138 or 140 and then powers on the slot C1 130 or the slot C2 132.

Control then continues to block 1015 where the HMC 156 sends a release service lock command to the hypervisor 112 that identifies the target slot that connects to the replacement adapter 138 or 140. The hypervisor 112 receives the release service lock command and, in response, clears the lock holder field in the entry in the partitionable endpoint lock/ownership table 128 for the slot C1 130 or the slot C2 132 and clears the entries in the partitionable endpoint lock/ownership table 128 for the virtual functions 146, 148, 150, or 152 that the replacement adapter 138 or 140 implements, indicating that the slot C1 130 or the slot C2 132 and the virtual functions 146, 148, 150, or 152 are no longer locked. Control then continues to block 1020 where the HMC 156 sends a vary on command to the hypervisor 112 that identifies the target slot that connects to the replacement adapter 138 or 140. The hypervisor 112 receives the vary on command and, in response, sets the lock holder field in the entry in the partitionable endpoint lock/ownership table 128 for the slot C1 130 or the slot C2 132 that connects to the replacement adapter 138 or 140, identifying the hypervisor 112 as the lock holder and activates the physical function 160 or 162 of the adapter 138 or 140.

Control then continues to block 1025 where the HMC 156 determines the logical partitions 104, 106, 108, or 110 that own the virtual functions 146, 148, 150, or 152 implemented by the replacement adapter 138 or 140 from the partitionable endpoint lock/ownership table 128 and sends vary on commands to the logical partitions 104, 106, 108, or 110 that own the virtual functions 146, 148, 150, or 152 implemented by the replacement adapter 138 or 140. The vary on commands identify the virtual functions 146, 148, 150, or 152. Control then continues to block 1030 where the logical partitions 104, 106, 108, or 110 receive the vary on commands and, in response, call the hypervisor 112 and request a lock of the virtual functions 146, 148, 150, or 152. In response to the call, the hypervisor 112 sets the lock holder fields in the entries in the partitionable endpoint lock/ownership table 128 for the virtual functions 146, 148, 150, or 152 identified by the respective call by the hypervisor 112, identifying the respective calling logical partition as the respective lock holder. The logical partitions further activate the resources (the virtual function device drivers) that use the virtual functions 146, 148, 150, or 152 specified by the vary on commands. Activating the virtual function device drivers comprises starting the virtual function device drivers executing on the processors and passing the DMA address range 180, the MMIO address range 182, the subordinate bus identifiers 184, and the secondary bus identifiers (all of which are unchanged since prior to the power off of the adapter) to the virtual function device driver. Control then continues to block 1099 where the logic of FIG. 10 returns.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention. Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense.

What is claimed is:

1. A method comprising:

receiving a power off command that specifies a slot, wherein a first adapter is connected to a computer via the slot, wherein the first adapter comprises a first physical function and a first virtual function;

in response to the power off command, stopping data transfer from a logical partition to the first virtual function, releasing a virtual function lock of the first virtual function held by the logical partition, and powering off the slot;

retaining ownership of the first virtual function by the logical partition while the virtual function lock is released and the slot is powered off, wherein the retaining ownership of the first virtual function by the logical partition further comprises using a same data transfer address by the logical partition to access the first virtual function in the first adapter and to access a second virtual function in a second adapter;

after the powering off of the slot, receiving a power on command that specifies the slot, wherein the second adapter comprises a second physical function and the second virtual function, and wherein the second adapter is connected to the computer via the slot and wherein the second adapter replaces the first adapter connected to the slot, wherein the first virtual function is a same virtual function as the second virtual function and wherein the second physical function is a same physical function as the first physical function; and in response to the power on command, powering on the slot, locking the virtual function lock of the same virtual function for the logical partition.

2. The method of claim 1, further comprising:
in response to the power off command, deactivating the first physical function and releasing a slot lock of the slot held by a hypervisor.

3. The method of claim 1, wherein the data transfer address comprises a memory mapped Input/Output address.

4. The method of claim 1, wherein the data transfer address comprises a direct memory address.

5. The method of claim 1, wherein the retaining ownership of the first virtual function by the logical partition further comprises:
using a same subordinate bus number by the logical partition to access the first virtual function in the first adapter and to access the second virtual function in the second adapter.

6. The method of claim 1, wherein the retaining ownership of the first virtual function by the logical partition further comprises:
using a same secondary bus number by the logical partition to access the first virtual function in the first adapter and to access the second virtual function in the second adapter.

7. A non-transitory computer-readable storage medium encoded with instructions, wherein the instructions when executed comprise:
receiving a power off command that specifies a slot, wherein a first adapter is connected to a computer via the slot, wherein the first adapter comprises a first physical function and a first virtual function;
in response to the power off command, stopping data transfer from a logical partition to the first virtual function, releasing a virtual function lock of the first virtual function held by the logical partition, and powering off the slot;
retaining ownership of the first virtual function by the logical partition while the virtual function lock is released and the slot is powered off, wherein the retaining ownership of the first virtual function by the logical partition further comprises using a same data transfer address by the logical partition to access the first virtual function in the first adapter and to access a second virtual function in a second adapter;
after the powering off of the slot, receiving a power on command that specifies the slot, wherein the second adapter comprises a second physical function and the second virtual function, and wherein the second adapter is connected to the computer via the slot and wherein the second adapter replaces the first adapter connected to the slot, wherein the first virtual function is a same virtual function as the second virtual function and wherein the second physical function is a same physical function as the first physical function; and
in response to the power on command, powering on the slot, locking the virtual function lock of the same virtual function for the logical partition.

8. The non-transitory computer-readable storage medium of claim 7, further comprising:
in response to the power off command, deactivating the first physical function and releasing a slot lock of the slot held by a hypervisor.

9. The non-transitory computer-readable storage medium of claim 7, wherein the data transfer address comprises a memory mapped Input/Output.

10. The non-transitory computer-readable storage medium of claim 7, wherein the data transfer address comprises a direct memory.

11. The non-transitory computer-readable storage medium of claim 7, wherein the retaining ownership of the first virtual function by the logical partition further comprises:
using a same subordinate bus number by the logical partition to access the first virtual function in the first adapter and to access the second virtual function in the second adapter.

12. The non-transitory computer-readable storage medium of claim 7, wherein the retaining ownership of the first virtual function by the logical partition further comprises:
using a same secondary bus number by the logical partition to access the first virtual function in the first adapter and to access the second virtual function in the second adapter.

13. A computer system, comprising:
a processor;
a slot communicatively coupled to the processor; and
memory communicatively coupled to the processor, wherein the memory is encoded with instructions, wherein the instructions when executed on the processor comprise:
receiving a power off command that specifies the slot, wherein a first adapter is connected to the slot, wherein the first adapter comprises a first physical function and a first virtual function,
in response to the power off command, stopping data transfer from a logical partition to the first virtual function, releasing a virtual function lock of the first virtual function held by the logical partition, and powering off the slot,
in response to the power off command, deactivating the first physical function,
retaining ownership of the first virtual function by the logical partition while the virtual function lock is released and the slot is powered off, wherein the retaining ownership of the first virtual function by the logical partition further comprises using a same data transfer address by the logical partition to access the first virtual function in the first adapter and to access a second virtual function in a second adapter,
after the powering off of the slot, receiving a power on command that specifies the slot, wherein the second adapter comprises a second physical function and the second virtual function, and wherein the second adapter is connected to the slot and wherein the second adapter replaces the first adapter connected to the slot, wherein the first virtual function is a same virtual function as the second virtual function and wherein the second physical function is a same physical function as the first physical function, and
in response to the power on command, powering on the slot, locking the virtual function lock of the same virtual function for the logical partition and releasing a slot lock of the slot held by a hypervisor.

14. The computer system of claim 13, wherein the data transfer address comprises a memory mapped Input/Output.

15. The computer system of claim 13, wherein the data transfer address comprises a direct memory.

16. The computer system of claim 13, wherein the retaining ownership of the first virtual function by the logical partition further comprises:
using a same subordinate bus number by the logical partition to access the first virtual function in the first adapter and to access the second virtual function in the second adapter.

17. The computer system of claim 13, wherein the retaining ownership of the first virtual function by the logical partition further comprises:

using a same secondary bus number by the logical partition to access the first virtual function in the first adapter and to access the second virtual function in the second adapter.

\* \* \* \* \*